United States Patent [19]
Detcher

[11] 4,113,626
[45] Sep. 12, 1978

[54] DEWATERING SCREEN

[75] Inventor: Theodore E. Detcher, Monroe, Ohio

[73] Assignee: The Black Clawson Company, Middletown, Ohio

[21] Appl. No.: 799,555

[22] Filed: May 23, 1977

Related U.S. Application Data

[63] Continuation of Ser. No. 614,885, Sep. 19, 1975, abandoned, which is a continuation-in-part of Ser. No. 451,876, Mar. 18, 1974, abandoned.

[51] Int. Cl.² .................... B01D 21/02; B01D 25/04
[52] U.S. Cl. .................... 210/409; 209/264; 209/274; 209/281; 209/393; 210/420; 210/433 R; 210/456; 210/495
[58] Field of Search ............... 209/264, 268, 277, 274, 209/393, 395, 17, 18, 65, 281; 210/456, 483, 495, 498, 499, 513, 409, 433 R, 420, 455; 29/457

[56] References Cited

U.S. PATENT DOCUMENTS

| 2,872,041 | 2/1959 | Fontein et al. | 209/393 |
| 2,942,730 | 6/1960 | Fontein | 209/393 |
| 3,007,574 | 11/1961 | DeKoning | 209/281 |
| 3,452,876 | 7/1969 | Ginaven | 209/264 |
| 3,815,740 | 6/1974 | Ginaven | 209/264 |

Primary Examiner—Frank Sever
Attorney, Agent, or Firm—Biebel, French & Nauman

[57] ABSTRACT

Screening apparatus provides improved dewatering of liquid slurries by flowing the slurry across a generally parabolically shaped perforate screening surface inclined at an angle to the horizontal. The angularity of the generally parabolically shaped screening surface is adjustable at any time or at any point in the screening process. The preferred embodiment of screen assembly, which incorporates multiple bars extending generally transversely of the flow direction of the slurry, is fabricated by a method which facilitates the provision of screening slots of different widths in different areas of the screening surface.

4 Claims, 11 Drawing Figures

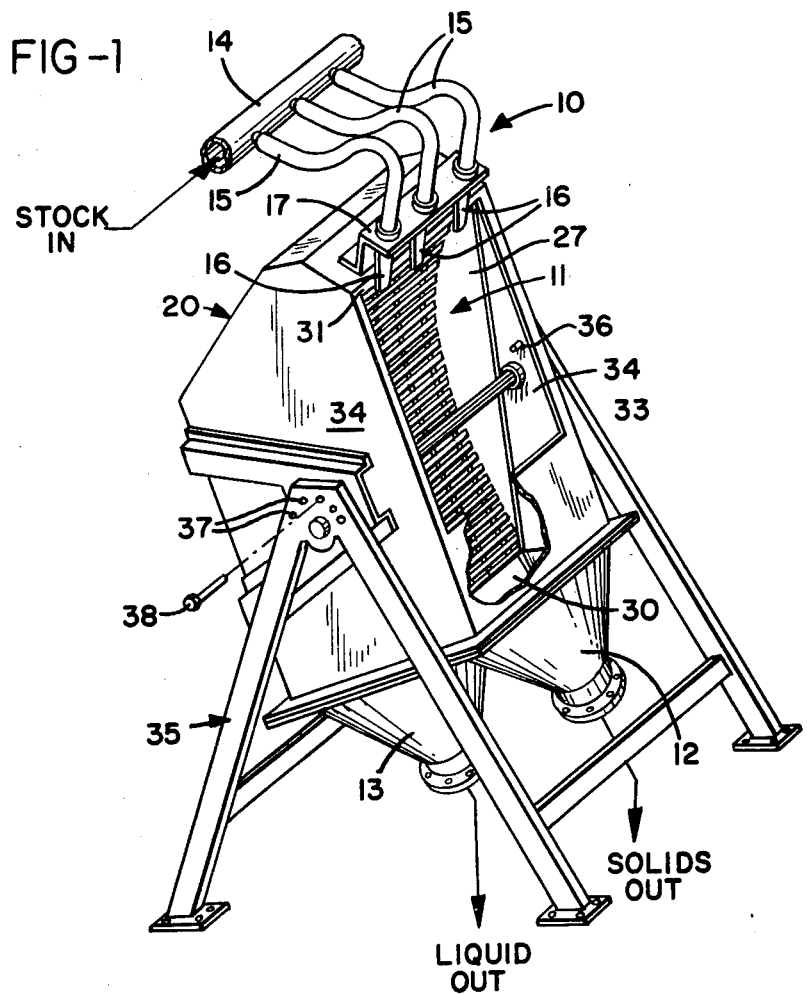
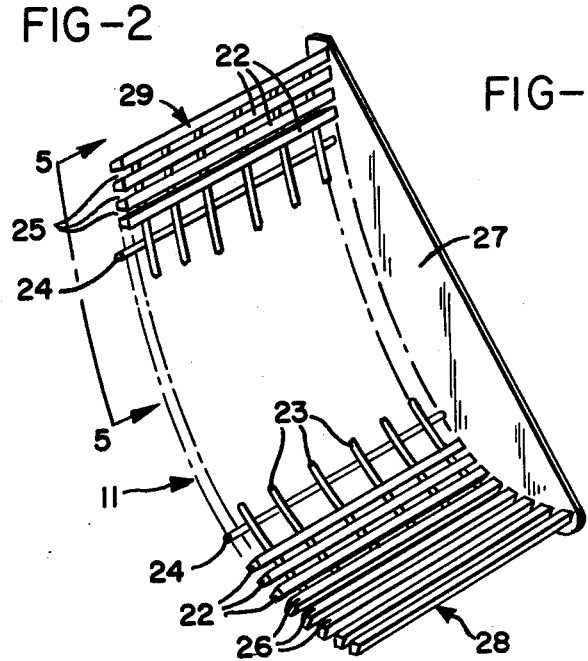
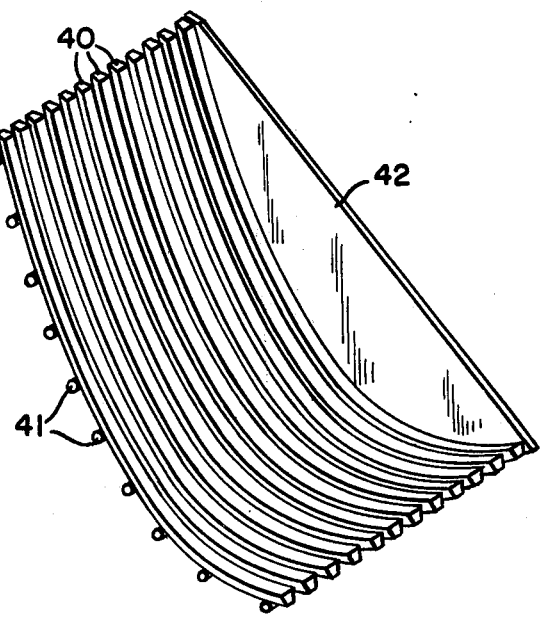

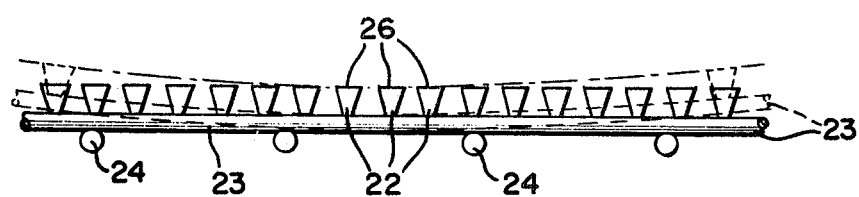
FIG-4
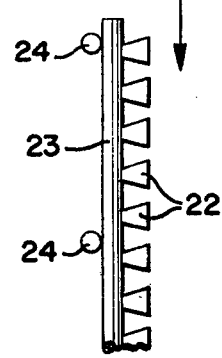
FIG-5
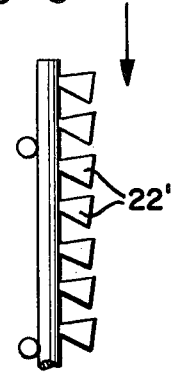
FIG-6
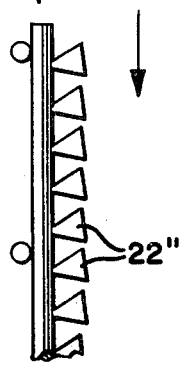
FIG-7
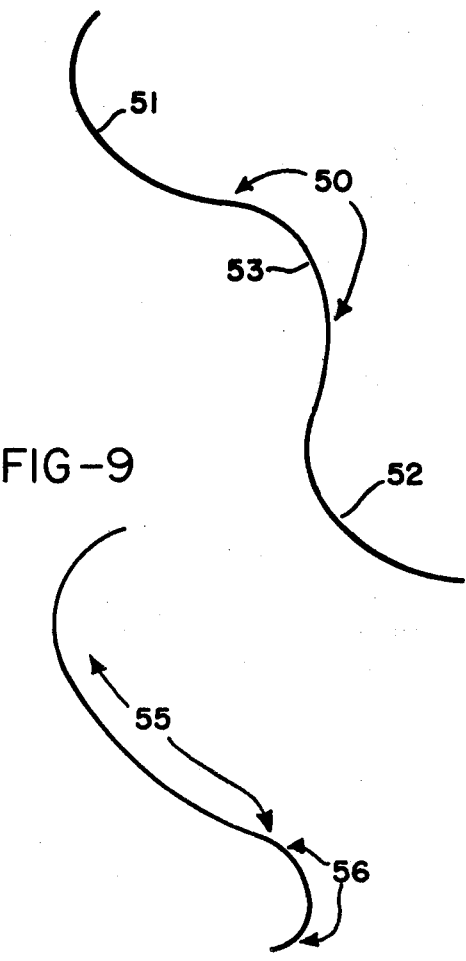
FIG-8
FIG-9
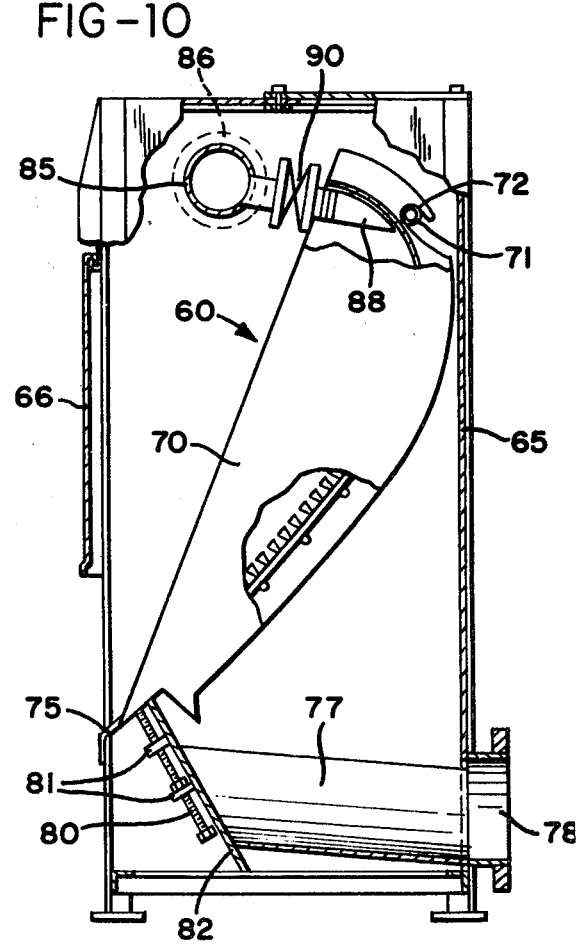
FIG-10

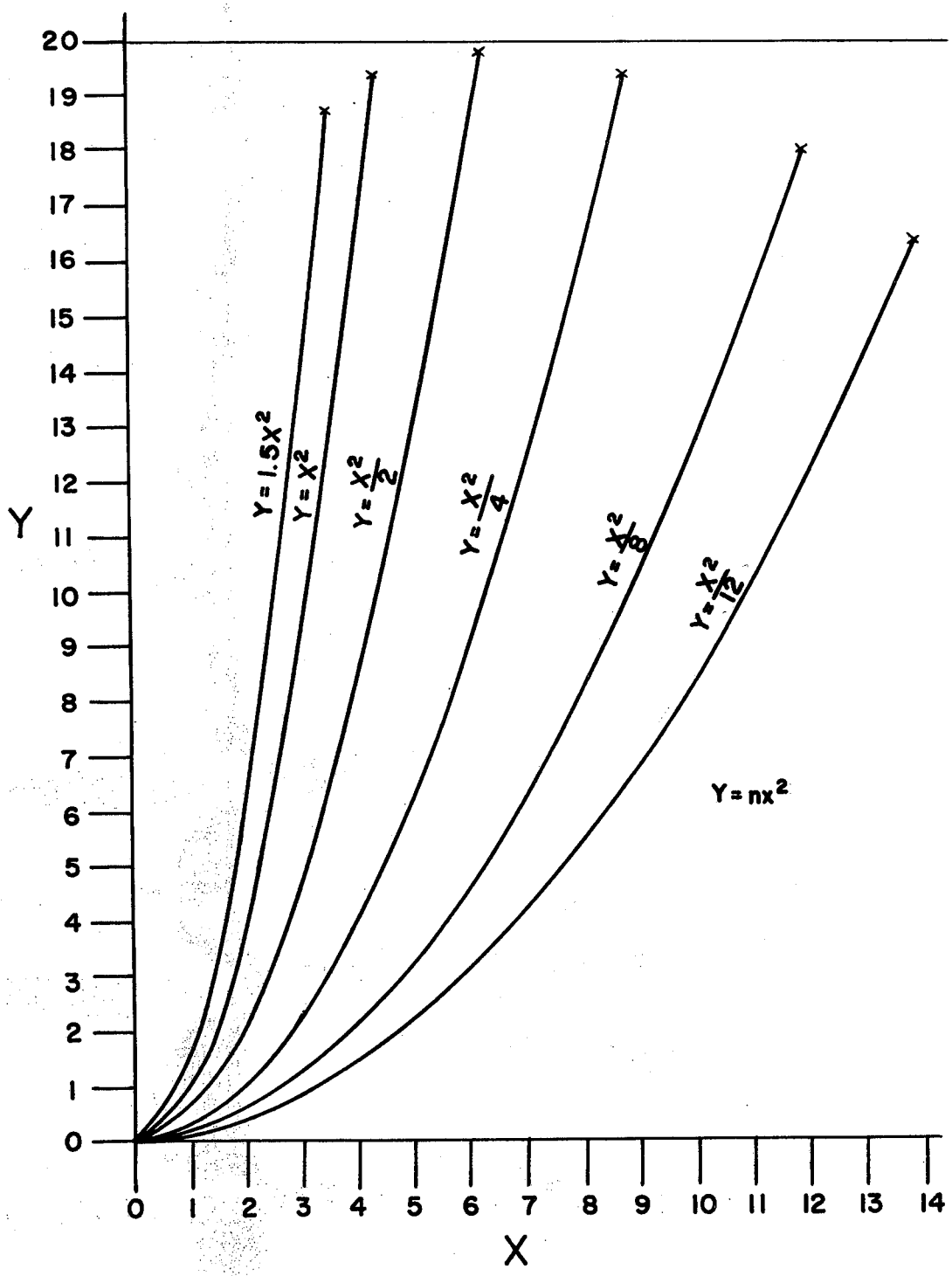

DEWATERING SCREEN

Related Applications

This application is a continuation of application Ser. No. 614,885, filed Sept. 19, 1975 as a continuation-in-part of application Ser. No. 451,876, filed Mar. 18, 1974, both of which applications are now abandoned.

BACKGROUND OF THE INVENTION

This invention relates to screening devices for separating liquids and dispersed solids from liquid slurries, and in particular to an improved dewatering screen having a parabolically curved screening surface, and a method of fabricating the same.

Many screening devices of the so-called "Sidehill" type have been used for the gravity separation of solids from liquid slurries, or the thickening of such slurries, by introducing the slurry to a perforated, slotted or mesh screening surface disposed at some sloping angle to the horizontal. By introducing the slurries at the top of an inclined screening surface, liquids are induced by gravity to drain away from the solid materials contained in the slurry, with the mass becoming progressively thickened as it flows downward across the screening surface.

The classic sidehill screen with a wire mesh surface, although useful, tends to provide a slow rate of drainage, in addition to a tendency to "blind" over. To overcome these problems, some devices have employed a bar-type slotted screen surface. The screening bars are generally rectangular or triangular in cross-section, and are arranged on and fixed to a backing to provide slots of a controlled width which is substantially continuous throughout the screening surface in any given direction. These bars have been disposed both parallel and at angles ranging up to 90° to the direction of flow of the incoming slurry to the inlet end of the screen.

Another approach has been screening devices of the constant or cylindrical curve type. These are generally premised on the assumption that the drainage characteristics of the slurry remain constant as the slurry passes downward on the curved surface, but the assumption has not proved to be true. Introduction of the slurry to the screening surface at a considerable velocity at the top thereof does provide rapid dewatering of the solids in the upper surfaces, but very little resistance to downward flow of the solids. As a result, a reduced dewatering rate occurs in the lower regions of the screen as the consistency of the slurry increases.

Thus none of the prior art devices or processes provide for the variability of the surface tension of the fluids in the slurry, the drainage rates of free water from the surface of the solid materials themselves, or the range of consistencies from incoming low consistency slurry to outgoing thickened slurry.

A need therefore exists for screening apparatus which takes into account the varying drainage rates, fluid surface tensions, and consistency ranges possessed by slurries as they are fed to and progress down dewatering screen surfaces.

SUMMARY OF THE INVENTION

The invention is characterized by a screening apparatus having a semi-parabolic screening surface. The parabolic shape of the screening surface compensates for the varying ability of liquid to be extracted from a slurry flowing thereon and results as its consistency changes, in greater forces being applied to the slurry in those areas where maximum advantage of the individual drainage forces can best be suited to the dewatering characteristics of the slurry. The consequential result is increased dewatering of the slurry at those points in the process when there would ordinarily be a decrease in the dewatering because of increased consistency.

The preferred embodiment comprises a screen assembly having a semi-parabolic concave vertically extending surface defined by horizontally extending wedge-shaped bars fixed in spaced parallel relation to appropriately curved support means, the bars and the spaces therebetween defining the screening surface. In another embodiment, the screen comprises vertically extending wedge-shaped bars supported in laterally spaced parallel relation.

A special feature of the preferred embodiment of the invention is its provision for variation of the width of the screening slots between the bars. Thus this form of parabolic screen assembly is readily fabricated by first securing the individual bars in uniformly spaced relation on an essentially open flat supporting structure. This assembly is then formed, e.g. with the aid of a mandrel or other pattern, to the desired parabolic curvature. This results effectively in curving the assembly about a radius which varies from a maximum at one end of the screen surface to a minimum at the other end, and therefore the bars adjacent the minimum radius end will be more closely spaced than those adjacent the maximum radius end.

A major advantage is provided in using the screen of the invention when the screening surface is mounted with its end of minimum radius curvature uppermost to receive the slurry to be screened while it is of minimum solids content or consistency and is moving at maximum velocity. The slots of minimum width in the upper portion of the screen will readily receive liquid from the slurry flowing thereacross for effective dewatering, and as the resulting thickened slurry continues to flow downwardly, it will encounter wider slots which will also accept liquid freely but will offer effective resistance to the passage of the thickened slurry therethrough.

Any of the screen assemblies of the invention may have sidewalls attached to their vertical peripheral sides to aid in keeping the slurry on the screening surface. The screens can be mounted in conventional screening apparatus comprising an input or feed means, and discharge means for both the thickened solids or oversized fraction and the liquid and/or undersized fraction.

Further, means are provided to adjust the angularity of the screening surface, so that adjustments can be made for variabilities in the slurry inputs, and dewatering efficiency can be optimized once the dewatering process has begun. The angularity of the screening surface is the relationship of a tangent to the screen at some point in the curvature thereof to a horizontal line, e.g., the ground. This is true regardless of the orientation of the screening surface.

Thus if a point on the profile of the surface of the parabolic curve defined by the screening surface is selected, and a tangent is drawn through that point, the tangent will intersect a horizontal reference line at some angle. This angle is the angularity of the screening surface. A reorientation of the screen will result in a change or adjustment in the angularity of the screen with respect to the tangent drawn through the previously referred to reference point. Means are also provided so that the angularity of the slurry input can be adjusted in relationship to any adjustment of the angularity of the screening surface.

These and other objects and advantages of the invention will be apparent from the following description, the accompanying drawings and the appended claims.

BRIEF DESCRIPTION OF THE DRAWINGS

In the drawings

FIG. 1 is a perspective view of dewatering apparatus embodying the present invention; FIGS. 2 and 3 are perspective views, partially broken away, of embodiments of a dewatering screen assembly in accordance with the invention for use in the apparatus of FIG. 1;

FIG. 4 is a side view illustrating the fabrication of the screen assembly of FIG. 2;

FIG. 5 is a partial elevation taken along the line 5—5 in FIG. 2 with one side wall removed;

FIGS. 6 and 7 are views similar to FIG. 5 showing other embodiments thereof;

FIGS. 8 and 9 are diagrammatic views illustrating other modifications of the invention;

FIG. 10 is a view partially in section and partially in elevation of a modified form of dewatering apparatus similar to that shown in FIG. 1; and FIG. 11 is a graph showing parabolic curves for incorporation in the dewatering screens of the invention.

DESCRIPTION OF THE PREFERRED EMBODIMENT

The screening apparatus shown in FIG. 1 includes a slurry feed or input section 10, a screen assembly 11, and a discharge section comprising discharge means 12 and 13. The principle use of this screening apparatus is to remove fluid and/or small fine particles from a low consistency slurry, with the thickened solids or larger sized solid fractions leaving the screening surface of assembly 11 via discharge means 12, while the liquid which passes through the screening surface falls into discharge means 13. Alternatively, this screening apparatus could be used to classify wet particles, in which case the oversized fraction of particles would leave screen assembly 11 via discharge 12, while the undersized particles and the liquid fraction would pass through the screening surface and out discharge 13. Thus just about any kind of particle suspension can constitute the slurry to be screened, including fibrous suspensions such as paper stock and white water, and non-fibrous suspensions such as starch.

The screening surface of assembly 11 is inclined at an angle to the horizontal which is steep enough to cause the slurry to slide or flow down it by gravity, with no vibrating force being applied to the screen. The angle will also be shallow enough that the slurry will not overflow the screen, and will vary with the type of material being screened. An alternative to gravity feed is pressure feed wherein the slurry is introduced to the screening surface under pressure and thus at a greater velocity than is provided by gravity. Pressure feed allows practically unlimited orientation for the screen, as gravity is no longer relied upon to hold the slurry on the screen.

FIG. 1 illustrates one embodiment of slurry feed or input section 10, comprising an input pipe or manifold 14 from a slurry source (not shown), which distributes the slurry to a plurality of hoses 15 connected to nozzles 16 arranged to feed the slurry to the surface of screen assembly 11. Three hoses are illustrated, but as many hoses can be used as are needed, as long as the slurry is effectively introduced along the width of the screening surface.

Nozzles 16 may be conveniently mounted on a rack or the like, such as rack 17 attached to housing 20. Once mounted and aimed, the nozzles will continue to distribute slurry uniformly to the screening surface of assembly 11 and at a fixed angle with relation to the screening surface. Nozzles may be used to impart a high initial velocity to the slurry, as an aid to dewatering, by uniformly feeding under pressure, or may merely distribute the slurry to the screen such that it is carried down the screen by the force of gravity alone. Further, other pressure feeding and/or distributing means can be employed as an alternative to nozzles, such as a pressure head box or the like.

In accordance with the invention, the screening surface of assembly 11 has a semi-parabolic shape. FIG. 11 graphically illustrates several parabolic curves which may be employed for the screening surface. The curves in FIG. 11 are based on the formula $Y = nX^2$, where $n$ varies between 1.5 and 1/12, and the values of $X$ and $Y$ are shown, but the invention is not necessarily limited to that formula. Additionally, and as required by the nature of the slurries fed to the screening apparatus, a logarithmic curve could be employed, e.g. $Y = (\log X)^n$. Further, such generally parabolic screens may be employed in series, as when a plurality of screens are arranged so as to permit cascading from one screening surface to another, and the like.

In the preferred form of the invention, the parabolic shape or curvature of the screening surface of assembly 11 is defined by multiple horizontally extending bars 22 which are generally wedge-shaped in section, i.e. of triangular or trapezoidal section, joined at their narrow edges to support rods 23 which are laterally spaced and formed to the desired parabolic shape, and which are also welded to spaced horizontal support rods 24. The series of slots 25 between the exposed large base surfaces 26 of adjacent bars 22 form the screening apertures and will ordinarily be of the order of 0.005 to 0.040 inch wide. Side walls 27 complete the screen assembly 11.

In this preferred form of the invention, the screen assembly 11 is most advantageously fabricated by welding the individual bars 22 in uniformly spaced relation to a flat supporting assembly comprising straight rods 23 welded to cross rods 24, as indicated in FIG. 4. This assembly is then readily formed to a preselected parabolic curvature, as by bending the series of support rods 23 with the aid of a mandrel or other pattern, and as already pointed out, the result will be that the curvature adjacent the end 28 will be about a series of shorter radii than the curvature along the majority of the screening surface approaching the other end 29, with the end of minimum radius corresponding with the zero point in the example illustrated in FIG. 11. The more significant result, however, is that the slots 25 between adjacent bars will become substantially narrower in the area adjacent the end 28 of minimum radius curvature than over the remaining area of the screening surface.

In the preferred use of the parabolically curved screen assembly 11 of the invention, it is mounted with its end of minimum radius curvature uppermost to receive the slurry directly from the nozzles 16 along that area of its screening surface wherein the slots 25 are of minimum width. This is especially desirable for dewatering purposes, because the initial supply is of minimum solids content or consistency and maximum velocity, and the narrowest slots will effect substantial dewatering with minimum removal of solids along with the water. Then after the increasingly higher consistency slurry continues to flow downwardly at decreasing speed along the surface of assembly 11, the progressively wider slots will also remove water substantially free of solids.

The practical significance of these operating conditions and effects becomes more apparent in the light of test results which establish that when a given screening surface having uniform slot widths is considered as consisting of five successive sections, drainage through each section diminishes by typically 50% as compared with the preceding section, and drainage through the initial section is therefore 16 times greater than through the last section. This emphasizes the importance of control of the drainage by variation of slot width, and especially of having minimum slot widths where the slurry has its lowest consistency and fluid removal is at a maximum in order to minimize the removal of solid particles with the liquid.

If the screen assembly 11 is mounted in the opposite orientation, with its end portion of minimum radius curvature at its lower end, a different set of dewatering conditions results. The initial delivery of slurry will be to the area of maximum radius curvature, but when the delivery is under pressure from nozzles 16 essentially parallel with the uppermost end of the screening surface, effective dewatering without substantial removal of solids will occur even though the slots 25 are widest in this area. Then as the thickening slurry continues down the screening surface, it will approach the area of minimum radius curvature and minimum slot width, which will tend to introduce a retarding action on the flow of the slurry for effective dewatering through the narrow slots without substantial loss of solids.

Screen assembly 11 may be mounted for operation in any conventional screening apparatus, but it is desirable to provide for adjustment of the relation of its screening surface to the vertical. As shown in FIG. 1, screen assembly 11 is mounted in housing 20 by supporting it on the partition 30 between discharge means 12 and 13 and at the top 31 of housing 20. In this way, a screen assembly 11 can be readily replaced when it is worn, and screen assemblies of different characteristics can be interchanged as desired.

Housing 20 is supported for rotational movement by a hinge pin or rod 33 which passes through the side walls 34 of housing 20, and is attached thereto by welding or the like, and through holes in frame 35. By mounting housing 20 for rotation about the axis of rod 33, the angularity of the surface of screen assembly 11 seated in housing 20 can be adjusted as desired in accordance with input slurry conditions and the desired screening results or effects.

In order to hold housing 20 in the selected angular positions, a hole 36 is provided in each of side walls 34 of housing 20, and multiple holes 37 are provided in frame 35 in such location that the loci of their axes describe an arc which coincides with the arc described by the movements of the axes of holes 36 when housing 20 is rotated about rod 25. Thus any angular position may be selected wherein the hole 36 on each side 34 coincides with one of holes 37, and by passing pin 38 through selected holes 36 and 37, the housing is locked in the selected angular position. To adjust or readjust the angularity of screen 11, it is a simple matter to remove pins 38 and realign holes 36 with others of holes 37. Alternatively, more sophisticated means, such as screws, levers, latches, and the like, can be employed to move and hold the housing in various angular positions.

The invention is not limited to any particular shape or material for or way of joining the screening bars. Rectangular or cylindrical shapes can also be used, so long as the bars have exposed flat surface areas defining the screening surface, and the bars can be made from metal, plastic or the like material. The bars need not be normal to the direction of flow of the slurry, and they can be angled to the flow direction. Thus FIG. 5 represents an arrangement wherein the exposed flat surfaces 26 of adjacent bars 22 are essentially coplanar and parallel with the flow direction of the slurry thereacross, but the bars can be canted in the direction of flow, i.e., the bars 22' in FIG. 6 are canted downstream, while bars 22" in FIG. 7 are canted upstream.

In the alternative construction of screen assembly shown in FIG. 3, each bar 40 has a parabolic shape and is supported by and joined to transversely extending, but vertically spaced, supporting rods 41 by welding or the like, and the side walls 42 correspond to side walls 27 in FIG. 2. The spacing of the bars 40 is not critical, and will depend upon such factors as the material being screened, the kind of classification desired and the like. Thus the spacing can range from a few thousandths of an inch to a rough grizzly. Some of the advantages of the invention can also be obtained using other materials, e.g. mesh or perforated or slotted plate stock, to provide the parabolically curved screening surface.

It is not essential either that screening apparatus in accordance with the invention comprise only one screen assembly 11, nor that the entire length of screening surface by concavely parabolically curved. For example, a plurality of screen assemblies can be combined end to end to define a single parabolic curve, in which case the individual assemblies are properly contoured for this purpose, or two parabolically curved concave screen assemblies may have a convexly curved assembly between them. Such an arrangement is illustrated diagrammatically in FIG. 8 which shows the outline of a screen assembly 50 comprising an upper concave parabolic section 51, a lower concave parabolic section 52, and an intermediate convexly curved section 53, and it will be understood that the several sections may be of different curvatures as needed for proper joining together.

It is also practical to provide a screen assembly as shown in FIG. 9 which is concavely parabolically curved over the majority 55 of its length but includes a short convexly curved section 56 at its discharge end, which will have the effect of accelerating the final discharge of solids off the screening surface.

An alternative construction of screening apparatus is shown in FIG. 10, wherein the screen assembly 60 is enclosed in a housing 65 of cabinet-like configuration provided with a partial front door 66. The screen assembly 60 is shown as of the same essential construction as the screen assembly 11, but its side plates 70 are slotted at 71 near one end to fit over a stationary pivot rod 72 fixed in the upper part of the housing 65. The lower end of the screen element 60 includes an imperforate extension 75 which forms a discharge lip for solids at the front of the housing 65. In the lower part of the housing 65 is a trough 77 for receiving fluids which pass through the screen openings and exit at a discharge port 78 at the back of the housing.

Provision is made for adjusting the screen assembly 60 pivotally about the rod 72. A plurality of adjusting screws 80 are mounted by individual pairs of nuts 81 welded to the front wall 82 of the trough 77. The upper ends of these screws 80 engage the under surface of the lip 75 to raise and lower it and the rest of the screen assembly 60 about the pivot rod 72.

The feed means for the screen assembly 60 in FIG. 10 comprises a header 85 extending across the top front of the housing 65 and provided with a port 86 at one end for connection to the supply source for the slurry to be screened. Multiple discharge nozzles 88 are mounted in spaced relation along the header 85, and each preferably includes an individually ad adjustable valve 90 to assure proper control of the volume and velocity of the slurry to be delivered to the upper end of the screen assembly.

While the apparatus herein described, and the methods for fabricating such apparatus constitute preferred embodiments of this invention, it is to be understood that the invention is not limited to these precise forms of apparatus and methods, and that changes may be made in either without departing from the scope of the invention.

What is claimed is:

1. Screening apparatus of the type described for separating a flowing liquid slurry into fractions by substantially unidirectional flow along a perforate screening surface, comprising
    (a) means defining a perforate screening surface having opposed sides and ends,
    (b) said screening surface means being of rigid structure and concave semi-parabolic shape from end to end thereof such that the curvature thereof varies from a zero point at one end thereof through a series of short radius adjacent said one end to a maximum radii adjacent the other end thereof in accordance with the formula $Y=nX^2$ where the zero point of said curvature is at the intersection of the X and Y axes, and $n$ varies between 1.5 and 1/12,
    (c) said screening surface means including an assembly of multiple parallel bars extending in closely spaced relation substantially parallel with said ends of said surface and having exposed flat surface areas which define said semi-parabolic screening surface,
    (d) the spaces between adjacent said bars constituting slots defining the perforations in said screening surface,
    (e) means supporting said screening surface means with said zero point end uppermost,
    (f) inlet means for supplying the slurry to said higher end of said screening surface whereby the angular velocity of the slurry is adjacent the maximum end of its range while the liquid content of the slurry is adjacent the maximum end of its range,
    (g) means for collecting the fraction of the slurry which is retained on said screening surface from the lower end thereof, and
    (h) means for separately collecting the fraction of said slurry which passes through said screening surface.

2. Screening apparatus as defined in claim 1 further comprising means supporting said screening surface means for pivotal movement about a horizontal axis to adjust the angularity thereof, and means for releasably holding said screening surface means in adjusted angular position.

3. Screening apparatus as defined in claim 1 wherein said bars are of generally trapezoidal section with their larger base surfaces exposed and defining said generally parabolic screening surface.

4. Screening apparatus as defined in claim 3 wherein said bar surfaces are progressively more widely spaced from said end of minimum radius curvature, to provide more narrow slots adjacent said end of minimum radius curvature than adjacent the other end of said screening surface.

* * * * *